(12) United States Patent
Xu et al.

(10) Patent No.: US 11,769,277 B2
(45) Date of Patent: Sep. 26, 2023

(54) DEEP LEARNING BASED SCATTER CORRECTION

(71) Applicant: KONINKLIJKE PHILIPS N.V., Eindhoven (NL)

(72) Inventors: Shiyu Xu, Mayfield Heights, OH (US); Peter Prinsen, Eindhoven (NL); Jens Wiegert, Aachen (DE); Ravindra Mohan Manjeshwar, Solon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 346 days.

(21) Appl. No.: 16/650,941

(22) PCT Filed: Sep. 28, 2018

(86) PCT No.: PCT/EP2018/076400
§ 371 (c)(1),
(2) Date: Mar. 26, 2020

(87) PCT Pub. No.: WO2019/063760
PCT Pub. Date: Apr. 4, 2019

(65) Prior Publication Data
US 2020/0273214 A1   Aug. 27, 2020

Related U.S. Application Data

(60) Provisional application No. 62/564,447, filed on Sep. 28, 2017.

(51) Int. Cl.
*G06T 11/00* (2006.01)
*G06N 3/08* (2023.01)

(52) U.S. Cl.
CPC .............. *G06T 11/005* (2013.01); *G06N 3/08* (2013.01); *G06T 2210/41* (2013.01)

(58) Field of Classification Search
CPC ...... G06T 11/005; G06T 2210/41; G06N 3/08
See application file for complete search history.

(56) References Cited

U.S. PATENT DOCUMENTS 6,740,883 B1 * 5/2004 Stodilka ................ G01T 1/1648
250/363.04
9,589,374 B1   3/2017 Gao
(Continued)

FOREIGN PATENT DOCUMENTS

CN   102033043 A   4/2011
CN   106124449 A   11/2016
WO   WO2017106645 A1   6/2017

OTHER PUBLICATIONS

PCT International Search Report, International application No. PCT/EP2018/076400, dated Dec. 17, 2018.
(Continued)

*Primary Examiner* — Shefali D Goradia
(74) *Attorney, Agent, or Firm* — Larry Liberchuk

(57) ABSTRACT

An imaging system includes a computed tomography (CT) imaging device (10) (optionally a spectral CT), an electronic processor (16, 50), and a non-transitory storage medium (18, 52) storing a neural network (40) trained on simulated imaging data (74) generated by Monte Carlo simulation (60) including simulation of at least one scattering mechanism (66) to convert CT imaging data to a scatter estimate in projection space or to convert an uncorrected reconstructed CT image to a scatter estimate in image space. The storage
(Continued)

medium further stores instructions readable and executable by the electronic processor to reconstruct CT imaging data (12, 14) acquired by the CT imaging device to generate a scatter-corrected reconstructed CT image (42). This includes generating a scatter estimate (92, 112, 132, 162, 182) by applying the neural network to the acquired CT imaging data or to an uncorrected CT image (178) reconstructed from the acquired CT imaging data.

11 Claims, 10 Drawing Sheets

(56) References Cited

U.S. PATENT DOCUMENTS

| | | | |
|---|---|---|---|
| 9,659,389 B2 | 5/2017 | Ye | |
| 11,126,914 B2* | 9/2021 | Thibault | G01N 23/046 |
| 2008/0253515 A1 | 10/2008 | Bertram | |
| 2013/0080070 A1 | 3/2013 | Pai | |
| 2018/0070894 A1* | 3/2018 | Osaki | A61B 6/488 |
| 2018/0293762 A1* | 10/2018 | Fu | G06T 11/006 |
| 2018/0330233 A1* | 11/2018 | Rui | G06N 3/084 |
| 2020/0234471 A1* | 7/2020 | Lu | G06T 11/005 |

OTHER PUBLICATIONS

Xu S. et al., "Deep Residual Learning in CT Physics: Scatter Correction for Spectral CT", Preprint Paper Published online on arXiv.org, Aug. 14, 2017 (Aug. 14, 2017), pp. 1-3, XP055530754.

Maier Joscha et al., "Deep Scatter Estimation (DSE): Accurate Real-Time Scatter Estimation for X-Ray CT Using a Deep Convolutional Neural Network", Journal of Nondestructive Evaluation, Plenum Publishing Corporationt. New York, US, vol. 37, No. 3, Jul. 10, 2018 (Jul. 10, 2018), pp. 1-9, XP036591855.

Simonyan et al., "Very Deep Convolutional Networks for Large-Scale Image Recognition," ICLR, Apr. 10, 2015.

Zhang et al., "Beyond a Gaussian Denoiser: Residual Learning of Deep CNN for Image Denoising," pp. 1-13, Aug. 13, 2016.

Johnson T. R. C. et al., "Dual-Energy CT: General Principles," Am. J. Roentgenol., Nov. 2012.

Alvarez R. E. et al., "Energy-Selective Reconstructions in X-Ray Computerized Tomography.," Phys. Med. Biol., 1976 , vol. 21, No. 5. pp. 733-744.

Bertram M. et al., "Scatter Correction for Cone-Beam Computed Tomography Using Simulated Object Models," in Proc SPIE, 2006, vol. 6142, p. 61421C.

Shin H. C. et al., "Deep Convolutional Neural Networks for Computer-Aided Detection: CNN Architectures, Dataset Characteristics and Transfer Learning", IEEE Transactions on Medical Imaging, vol. 35, No. 5, pp. 1285-1298, May 2016.

Wang. G. et al., "A Perspective on Deep Imaging," IEEE Access, vol. 4, pp. 8914-8924, 2016.

* cited by examiner

DEEP LEARNING BASED SCATTER CORRECTION

FIELD

The following relates generally to the transmission computed tomography (CT) imaging arts, spectral CT imaging arts, CT image reconstruction arts, medical imaging arts, image reconstruction arts, scatter correction arts, and related arts.

BACKGROUND

A source of image artifacts or degradation in CT imaging is scatter, which can originate in CT scanner hardware components such as off-focal x-ray sources, filters mounted with the x-ray tube assembly, or by way of scatter in the imaging subject. Scatter can change the direction of an x-ray, or in the case of inelastic scattering can change the energy, or both. Existing scatter correction approaches include convolution/deconvolution techniques, which rely on approximating assumptions, which may not hold well in real imaging situations, or Monte Carlo simulation, which can be highly accurate if the simulated samples are sufficiently large, but is computationally expensive. Hardware approaches such as the use of anti-scatter grids can also reduce the scatter, but add substantial equipment cost and cannot eliminate all scatter.

In the case of spectral or dual energy CT, scatter can be more problematic. Spectral CT processes the detected x-ray absorption data as a function of energy to extract additional information. Decomposition of the x-ray data into spectral components can be done in various ways, such as by employing energy-selective filters in the x-ray tube assembly, or using x-ray detectors with multiple, spectrally differentiated detector layers. An example of the latter approach is the IQon™ Spectral CT system available from Koninklijke Philips N.V., Eindhoven, the Netherlands, which uses a Yttrium-based scintillator and a dual-layer spectral detector having an upper layer that preferentially detects lower energy x-rays and a lower layer that preferentially detects higher energy x-rays that penetrate through the upper layer. The resulting low energy and high energy projection data sets can be processed separately to generate respective low energy and high energy images. In other approaches, these projection data sets are first decomposed using suitable basis functions to generate projection data indicative of particular tissues or substances. In general, materials with lower atomic number, such as water, have similar low and high energy images, whereas materials with higher atomic number, such as iodine, have larger differences between the low and high energy images. This can be leveraged in the decomposition process to generate effective-Z images that more effectively capture the distribution of materials of a certain atomic number. For example, effective-Z images tuned to focus on iodine are useful for better visualization of uptake of an administered iodine-based contrast agent.

Since the influence of atomic number is a secondary effect, spectral or dual-energy CT is typically more sensitive to noise sources, particularly scatter, as compared with conventional CT. Moreover, the amount of scatter is energy-dependent. In non-linear decomposition sometimes performed in spectral or dual-energy CT, scatter in the low and high energy projection data sets can be further amplified in the decomposed results, and in general, decomposed spectral images are more sensitive to scatter induced artifacts.

The following discloses a new and improved systems and methods.

SUMMARY

In one disclosed aspect, a non-transitory storage medium stores instructions readable and executable by an electronic processor to perform a method. Computed tomography (CT) projection data are reconstructed to generate a scatter-corrected reconstructed CT image. A scatter estimate is generated. In one approach, the scatter estimate is generated by inputting the CT projection data into a neural network to generate the scatter estimate in projection space; in this approach, the reconstructing includes correcting the CT projection data using the scatter estimate in projection space to generate scatter-corrected CT projection data, and reconstructing the scatter-corrected CT projection data to generate the scatter-corrected reconstructed CT image. In another approach, the scatter estimate is generated by inputting an uncorrected reconstructed CT image into a neural network to generate the scatter estimate in image space; in this approach, the reconstructing includes reconstructing the CT projection data to generate the uncorrected reconstructed CT image and correcting the uncorrected reconstructed CT image using the scatter estimate in image space to generate the scatter-corrected reconstructed CT image.

In another disclosed aspect, simulated CT imaging data are generated by Monte Carlo simulation of CT imaging including simulation of at least one scattering mechanism producing a simulated scatter projection data component of the simulated CT projection data. A neural network is then optimized to generate a scatter estimate. In one approach, the optimization entails training the neural network to transform the simulated CT projection data to a simulated scatter estimate for which a value of a difference metric comparing the simulated scatter estimate to the simulated scatter projection data component of the simulated CT projection data is minimized by the training. In another approach, the optimization entails reconstructing the simulated CT projection data to generate a simulated uncorrected reconstructed CT image including reconstructing the simulated scatter projection data component into a simulated scatter image component of the simulated uncorrected reconstructed CT image, and training the neural network to transform the simulated uncorrected reconstructed CT image to a simulated scatter estimate for which a value of a difference metric comparing the simulated scatter estimate to the simulated scatter image component is minimized by the training. The method may further include acquiring CT imaging data using a CT imaging device, and reconstructing the CT imaging data to generate a scatter-corrected reconstructed CT image, wherein the reconstructing includes generating a scatter estimate for the CT imaging data by applying the optimized neural network to the CT imaging data or to an uncorrected reconstructed CT image generated from the CT imaging data.

In another disclosed aspect, an imaging system includes a CT imaging device (optionally a spectral CT imaging device), an electronic processor, and a non-transitory storage medium storing at least one neural network trained on simulated imaging data generated by Monte Carlo simulation including simulation of at least one scattering mechanism to convert CT imaging data to a scatter estimate in projection space or to convert an uncorrected reconstructed CT image to a scatter estimate in image space. The storage medium further stores instructions readable and executable by the electronic processor to reconstruct CT imaging data acquired by the CT imaging device to generate a scatter-corrected reconstructed CT image. The reconstructing includes generating a scatter estimate by applying the at least one neural network to the acquired CT imaging data or to an uncorrected reconstructed CT image generated from the acquired CT imaging data.

One advantage resides in more accurate scatter correction in CT imaging.

Another advantage resides in more computationally efficient scatter correction in CT imaging.

Another advantage resides in scatter correction in CT imaging that more accurately accounts for amplified scatter in decomposed spectral images.

Another advantage resides in providing scatter correction in CT imaging which is readily tuned to the particular CT scanner configuration (e.g. the choice of x-ray filter) and to the particulars of the patient or other imaging subject (e.g. girth, size).

Another advantage resides in providing scatter correction in spectral or dual energy CT imaging in which amplified scatter in spectral images is readily accounted for in a computationally efficient manner.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

In approaches for scatter correction disclosed herein, deep residual learning employed, based on the insight disclosed herein that the scatter distribution of a pencil beam can be determined from its corresponding air-normalized raw signal (primary plus scatter) and the signal in the surrounding area. Therefore, to train a neural network to generate a scatter estimate, the input is suitably a projection with air-normalized raw signal and its label is the corresponding scatter signal, which is calculated in a Monte Carlo simulation. Deep residual learning is a learning framework to detect patterns of small signal in complex and large content signal. In some illustrative embodiments, the neural network is designed with 17 layers with sufficient receptive area, although this is merely a non-limiting illustrative example. The disclosed approach leverages a residual learning framework where the neural network learns the small offset scatter signal from the large and complexed raw signal. Monte Carlo simulation is employed to generate training data. The Monte Carlo simulation simulates the primary CT projections and simulates one or more scattering mechanisms—accordingly, a full simulation CT projection data set is generated, with the scatter component identifiable since it is generated by simulation of the scatter mechanism(s). Thus, the full simulation CT projection data set serves as the training input, and the known scatter component enables assessment of the accuracy of the output of the neural network, e.g. measured by a difference metric comparing the simulated scatter estimate (i.e. the output of the neural network) to the simulated scatter projection data component of the Monte Carlo simulated CT projection data. The training adjusts weights or other parameters of the neural network to minimize the value of this difference metric.

Figure 1:
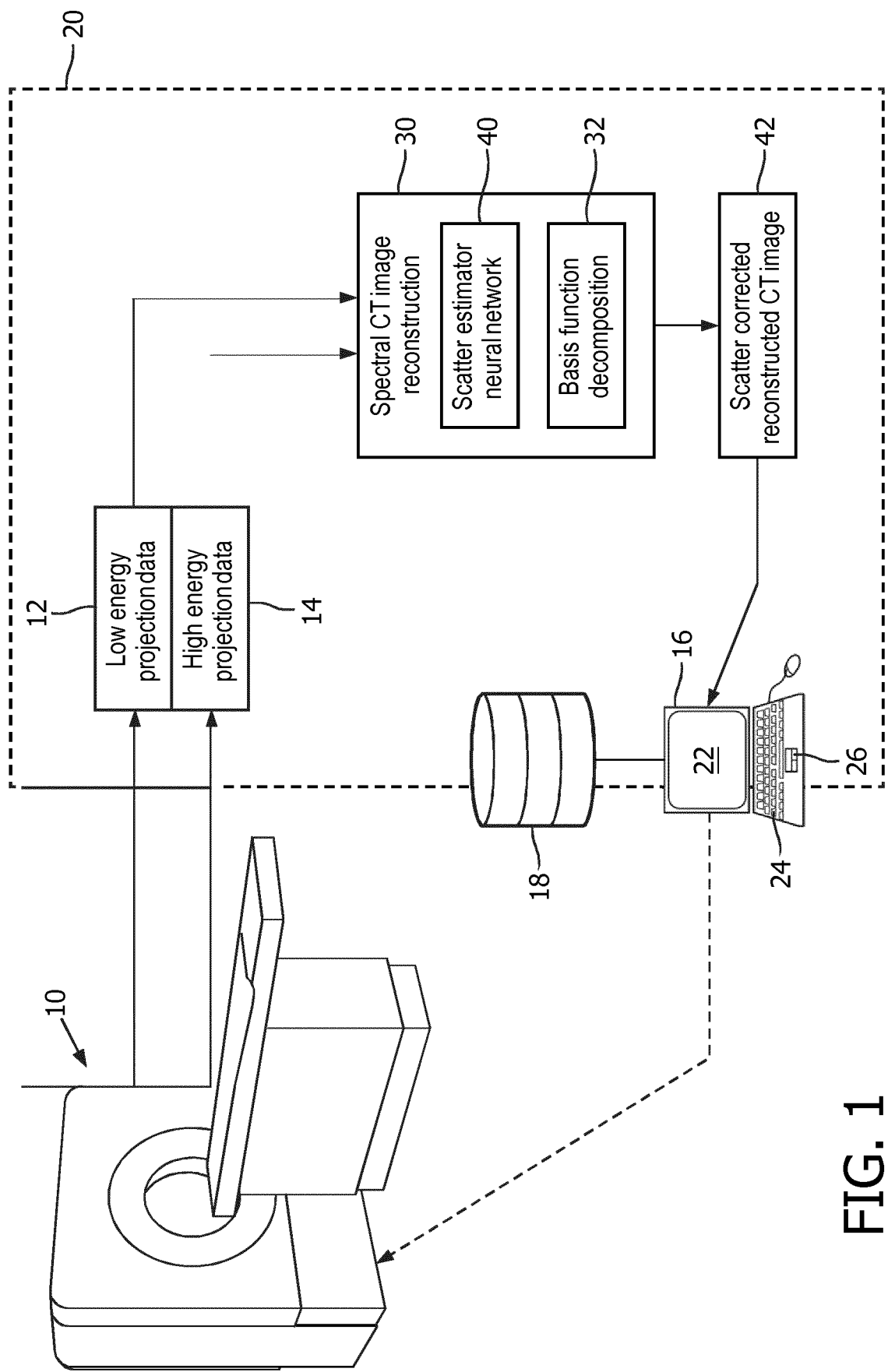
FIG. 1 diagrammatically illustrates a spectral CT imaging system including scatter correction as disclosed herein.

With reference to FIG. 1, an illustrative computed tomography (CT) imaging system includes a CT imaging device 10, which in the illustrative example is a spectral CT imaging device that acquires low energy CT projection data 12 and high energy CT projection data 14. For example, the CT imaging device 10 may be an IQon™ Spectral CT device available from Koninklijke Philips N.V. The IQon™ Spectral CT uses a Yttrium-based scintillator and a dual-layer spectral detector having an upper layer that preferentially detects the lower energy x-rays thereby collecting the low energy projection data 12, and a lower layer that preferentially detects higher energy x-rays that penetrate through the upper layer thereby collecting the high energy projection data 14. Other spectral CT data acquisition techniques can be employed, e.g. using spectral modulation of the x-ray tube assembly by way of filters or the like. Moreover, while the higher sensitivity of spectral CT to scatter makes the disclosed approaches of particular value in spectral CT, the disclosed approaches for scatter correction are also readily applied to conventional (i.e. non-spectral) CT which is also adversely affected by uncorrected scatter. It should also be noted that the disclosed scatter correction approaches are usable in combination with scatter mitigation techniques such as the use of anti-scatter grids, use of other scatter correction algorithms such as convolution or deconvolution based scatter correction, and/or so forth.

The CT imaging data, e.g. the illustrative low energy CT projection data 12 and/or high energy CT projection data 14, are reconstructed by an electronic processor 16, such as the microprocessor and ancillary components (e.g. memory, math coprocessor, ASIC circuitry, and/or so forth) of an illustrative computer 16, which reads and executes instructions stored on a non-transitory storage medium 18 to perform an illustrative image reconstruction method 20. More generally, the electronic processor 16 may be embodied by a desktop computer, a server computer, a plurality of server computers operatively connected to form a computing cluster, an ad hoc cloud computing resource, or so forth. The non-transitory storage medium 18 may be variously embodied, e.g. as one or more of: a hard disk drive or other magnetic storage medium; a flash memory, solid state drive (SSD), or other electronic storage medium; an optical disk or other optical storage medium; various combinations thereof; and/or so forth. The non-transitory storage medium 18 may be integrated with the computer 16, e.g. as a built-in internal hard drive, and/or may be located externally or remotely, e.g. embodied as a network-based server storage such as a RAID. The illustrative computer 16 includes a display 22 for displaying reconstructed CT images, and one or more user input devices such as an illustrative keyboard 24, mouse or trackpad 26, and/or so forth. In some embodiments, the computer 16 or other electronic processor serves as the electronic controller or host computer for operating the CT imaging device 10.

With continuing reference to FIG. 1, the illustrative image reconstruction method 20 performs a spectral CT image reconstruction process 30. This includes applying a basis function decomposition to the low energy CT projection data 12 and/or high energy CT projection data 14 to generate a CT projection data set for reconstruction. By way of illustration, a basis function decomposition 32 may be applied to generate effective-Z CT projection data sets that more effectively capture the distribution of projections expected for materials of a certain atomic number. For example, a effective-Z CT projection data set that is tuned to focus on iodine may be generated, which is useful for better visualization of uptake of an administered iodine-based contrast agent. Likewise, a effective-Z CT projection data set that is tuned to focus on water may be generated, which is useful for visualization of the general anatomical context. The resulting iodine and water images can be used by a skilled radiologist or other medical professional to elucidate substantially more clinical information than can be obtained from an image reconstructed from spectrally unresolved projection data. In other applications, it is contemplated to reconstruct a CT projection data set consisting of only the low energy CT projection data 12, or to reconstruct a CT projection data set consisting of only the high energy CT projection data 14, or to reconstruct a CT projection data set consisting of the combination of the low energy CT projection data 12 and the high energy CT projection data 14, and/or so forth. In the case of a non-spectral CT imaging device, the collected CT projection data are generally reconstructed as a whole without any spectral decomposition.

The chosen CT projection data (e.g. chosen as one of the low or high energy data sets 12, 14, or as the combined data set 12, 14, or as a data set generated by the basis function decomposition 32, or so forth) is reconstructed by the CT image reconstruction 30, which may employ any suitable reconstruction algorithm such as filtered backprojection (FBP), an iterative forward-backward projection reconstruction process, a maximum likelihood (ML) estimation-based algorithm such as maximum likelihood-expectation maximization (ML-EM), ordered subsets expectation maximization (OSEM), or so forth. To correct for scatter, a scatter estimator neural network 40 is applied to generate a scatter estimate that is used in the scatter correction. Depending upon its design, the scatter estimator neural network 40 may be applied to the CT projection data, that is, in the projection domain, to generate a scatter estimate in the projection domain. This estimate is then applied to correct the CT projection data and the thusly corrected CT projection data is reconstructed to generate the scatter corrected CT image. Alternatively, the scatter estimator neural network 40 may be designed to be applied after the image reconstruction, to the uncorrected reconstructed CT image, that is, in the image domain, to generate a scatter estimate in the image domain that is used to correct the uncorrected reconstructed CT image to generate the scatter corrected reconstructed CT image.

The use of the scatter estimator neural network 40 has numerous advantages. As disclosed herein, it is suitably trained off-line on training data generated by Monte Carlo simulation—as a consequence, it provides high accuracy scatter correction comparable with that achieved by the Monte Carlo simulation, but with high (on-line) computational efficiency achievable by trained neural networks such as a trained convolutional neural network (CNN). Thus, the disclosed approaches provide scatter correction that is both fast (i.e. computationally efficient) and accurate. Moreover, it is straightforward to train a plurality of different scatter estimator neural networks on different Monte Carlo simulations so as to generate scatter estimator neural networks tuned to provide accurate scatter correction for human subjects of different anatomical dimensions or body weights (e.g. different girths), and/or to generate scatter estimator neural networks tuned to provide accurate scatter correction for scattering by different filters installable on the x-ray tube assembly of the CT imaging device 10, and/or so forth. These different scattering mechanisms or characteristics can be readily accommodated by employing as the scatter estimator neural network 40 that network which was trained on the most similar Monte Carlo simulation, and furthermore new situations (e.g. a newly purchased filter, imaging of an archaeological mummy or some other imaging subject that may not be well-represented by existing scatter estimator neural networks that have been trained on medical patients) can be accommodated by performing Monte Carlo simulation for the new situation and training a suitable scatter estimator neural network. Still further, it is straightforward to account for different scatter mechanisms by successively applying the appropriate scatter estimator neural networks— e.g. one network may be trained to generate a scatter estimate for an x-ray tube filter, and another may be trained to generate a scatter estimate for the patient, and these may be applied in succession to generate the total scatter estimate including scatter due to both the filter and patient scatter mechanisms.

The resulting scatter corrected reconstructed CT image 42 is suitably displayed on the display 22 of the computer 16, and/or stored in a Picture Archiving and Communication System (PACS) or other image storage or repository, and/or otherwise utilized.

Figure 2:
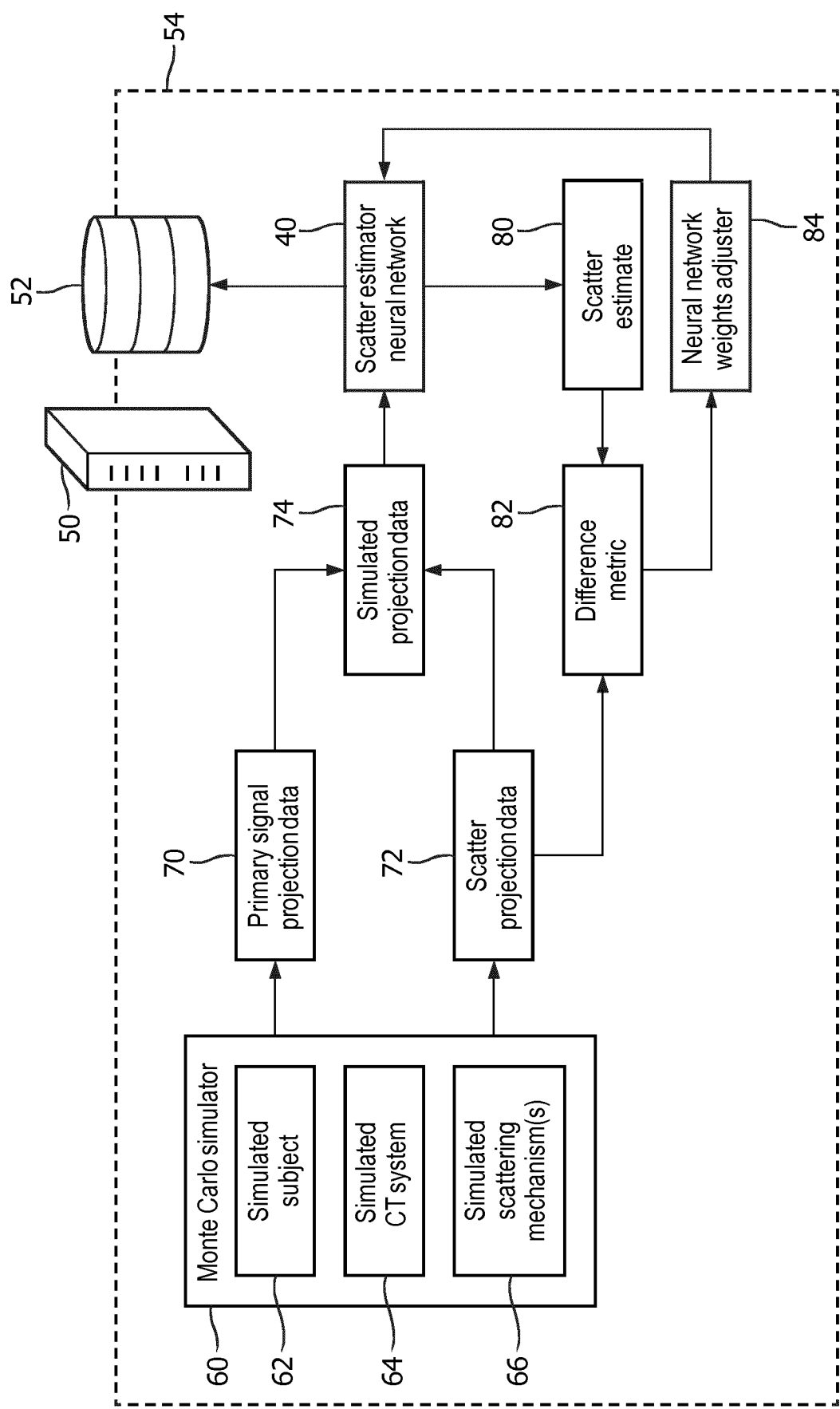
FIG. 2 diagrammatically illustrates a device and method for constructing a scatter estimator neural network for use in the scatter correction of the spectral CT imaging system of FIG. 1.

With reference to FIG. 2, a suitable approach for training the scatter estimator neural network 40 is described. The training employs computationally intensive Monte Carlo simulation, and accordingly is preferably performed off-line, that is, well before the resulting trained scatter estimator neural network 40 is used to perform scatter correction for actual clinical CT projection data. In some embodiments, the training may be performed by the vendor of the CT imaging device 10 and the resulting scatter estimator neural network 40 may be supplied on an optical disk or other non-transitory storage medium as a component of the commercial CT imaging system including the CT imaging device 10. In view of the computational complexity of the training, in the illustrative embodiment the training is performed by a server computer 50 which reads and executes instructions stored on a non-transitory storage medium 52 to perform an illustrative neural network training process 54. More generally, the electronic processor 50 may be embodied by a desktop computer (possibly the same computer 16 as in FIG. 1 that performs the image reconstruction with scatter correction), the illustrative server computer, a plurality of server computers operatively connected to form a computing cluster, an ad hoc cloud computing resource, or so forth. The non-transitory storage medium 50 may be the same as non-transitory storage medium 18 of FIG. 1 and/or may be some other hard disk drive or other magnetic storage medium, a flash memory, SSD or other electronic storage medium, optical storage medium, various combinations thereof, and/or so forth.

With continuing reference to FIG. 2, a Monte Carlo simulator 60 simulates CT imaging of a simulated subject 62 using a simulated CT system 64 and including one or more simulated scatter mechanisms 66. Monte Carlo simulation is a known technique in which repeated statistical sampling is used to generate a simulated distribution of events. In the instant case, the simulated events are transmitted x-rays, and each x-ray may be absorbed in any part of the simulated subject 62 with some (in general spatially dependent) absorption probability (thus, this aspect of the simulated subject 62 may be represented using an absorption or attenuation map of the subject, possibly one created from an actual CT image of a subject). Preferably, the simulated CT imaging subject 62 is a close approximation of subjects (e.g. patients) that are likely to be imaged using the CT imaging device 10. Optionally, the neural network training described with reference to FIG. 2 can be repeated using Monte Carlo simulation data for different types of subjects (e.g. different girths, heights, et cetera) and/or for different imaged regions, so as to provide sufficiently accurate simulation data for training the neural network to estimate scatter. The simulated CT system 64 provides the geometry of the simulated x-rays (e.g. the simulated x-ray events are simulated over a distribution of directions in accord with a distribution of x-rays in the fan-beam, cone-beam, or other x-ray beam being simulated) and the distance to the x-ray detector array as well as simulation of detector sensitivity and other CT imaging device characteristics. Preferably, the simulated CT system 64 is a close approximation of the actual CT imaging device 10 for which scatter is to be estimated.

The Monte Carlo simulator 60 also simulates one or more scatter mechanisms 66. This aspect may be integral with the simulated subject 62 and/or the simulated CT imaging device 64. For example, the scattering mechanism of scatter in the imaging subject may be integral with the simulated subject 62, e.g. by modelling (in addition to the spatially-dependent absorption probability) the (again spatially-dependent) probability that an x-ray will be scattered, and if so the distribution of scattered x-ray direction and (in the case of inelastic scattering) the distribution of x-ray energy after scattering. As another example, the scattering mechanism of scatter in a filter installed in the x-ray tube assembly may be integral with the simulated CT device 64, e.g. by modelling the probability that an x-ray will be scattered at the filter, and if so the distribution of scattered x-ray direction and (in the case of inelastic scattering) the distribution of x-ray energy after scattering at the filter. The modelling of the various scattering mechanisms can employ any first principles and/or empirical scatter model for the scattered x-ray directional and energy distributions.

With continuing reference to FIG. 2, the output of the Monte Carlo simulator is a set of simulation events, in this case a set of simulated x-ray events. It should be noted that each simulated x-ray does not necessarily correspond to a single simulated x-ray photon, although it may so correspond. More generally, however, a simulated x-ray may be a discrete unit of x-ray energy or flux of sufficient resolution to generate the final distribution of samples with sufficient resolution for the scatter estimation. Each x-ray (e.g., each x-ray photon, or each x-ray flux unit, or each x-ray energy unit, et cetera) is individually simulated and may or may not undergo scatter with probability as defined by the simulated scatter mechanism(s) 66. The simulation of each x-ray has a deterministic outcome (e.g. scattered, or not scattered) and the statistical distribution of scattered/non-scattered events is captured by the distribution of these simulated deterministic outcomes. Advantageously, each simulated x-ray is known to be either a non-scattered x-ray or a scattered x-ray, and therefore the simulated x-rays can be grouped into (1) a primary signal projection data set 70 containing those simulated events (x-rays) that were not scattered, and (2) a scatter projection data set 72 containing those simulated events (x-rays) that did undergo a scatter event. (A significant number of photons may undergo multiple scattering events. In a variant embodiment, a more accurate Monte Carlo simulation keeps track of the number of times an x-ray is scattered). This segregation of events into non-scattered 70 or scattered 72 constitutes information available in the Monte Carlo simulation, which is not available for actually measured projection data (e.g. the low or high energy projection data 12, 14 acquired by the CT imaging device 10 in FIG. 1). A combined simulation projection data set 74 which combines the non-scattered and scattered projection data 70, 72 represents the actual lesser knowledge obtained by the actual CT imaging data collection process.

The training process for training the scatter estimator neural network 40 uses the simulated projection data 74 and the scatter projection data component 72. The goal is to train the neural network 40 to transform the simulated CT projection data 74 to a simulated scatter estimate 80 for which a value of a difference metric 82 comparing the simulated scatter estimate 80 to the simulated scatter projection data component 72 of the simulated CT projection data 74 is minimized by the training. In each iteration of the training, the simulated projection data 74 is input to the neural network 40 to generate the simulated scatter estimate 80. The difference metric 82 is applied to compute the value of the difference metric 82 comparing the current-iteration simulated scatter estimate 80 to the simulated scatter projection data component 72 of the simulated CT projection data 74. This difference determines how well the neural network 40 is operating to generate the scatter estimate. A neural network weights adjuster 84 applies any suitable neural network update process, such as a gradient descent optimization algorithm employing backpropagation to compute the gradient of the difference metric 82, in order to compute updated weights for the neural network 40. The process repeats iteratively until a stopping criterion is met, such as (in some illustrative examples) the value of the difference metric 82 falling below a stopping threshold, or the iteration-over-iteration change in the value of the difference metric 82 falling below a stopping threshold and/or so forth. The final trained scatter estimator neural network 40, including the optimized neural network weights, is stored in the data storage 52 and/or transferred to the data storage 18 (see FIG. 1) for use in scatter correction of actually acquired CT projection data.

The illustrative scatter estimator neural network training shown in FIG. 2 employs Monte Carlo simulation to generate the simulated CT projection data 74 including separable primary and scatter data components 70, 72. More generally, other methods are contemplated to generate the simulated CT projection data for the training, such as Kernel methods or Linear Poisson Boltzmann Equation (LPBE) solvers.

Figure 3:
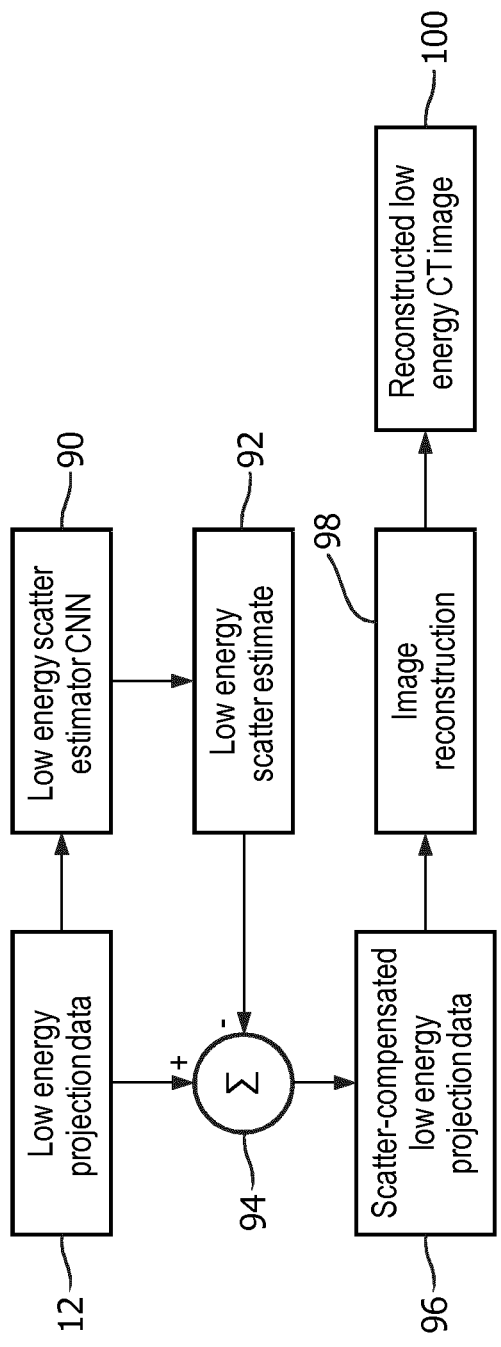
FIGS. 3, 4, and 5 diagrammatically show various approaches by which the spectral CT imaging system of FIG. 1 can perform CT image reconstruction including scatter correction performed in the projection domain using one or more scatter estimator neural networks.
Figure 4:
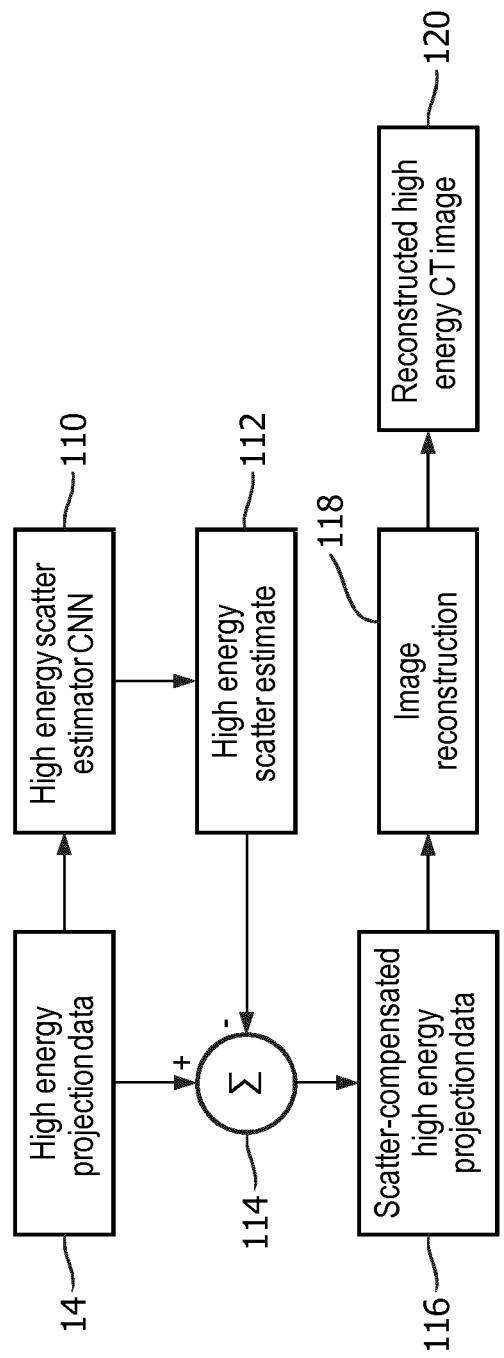
Figure 5:
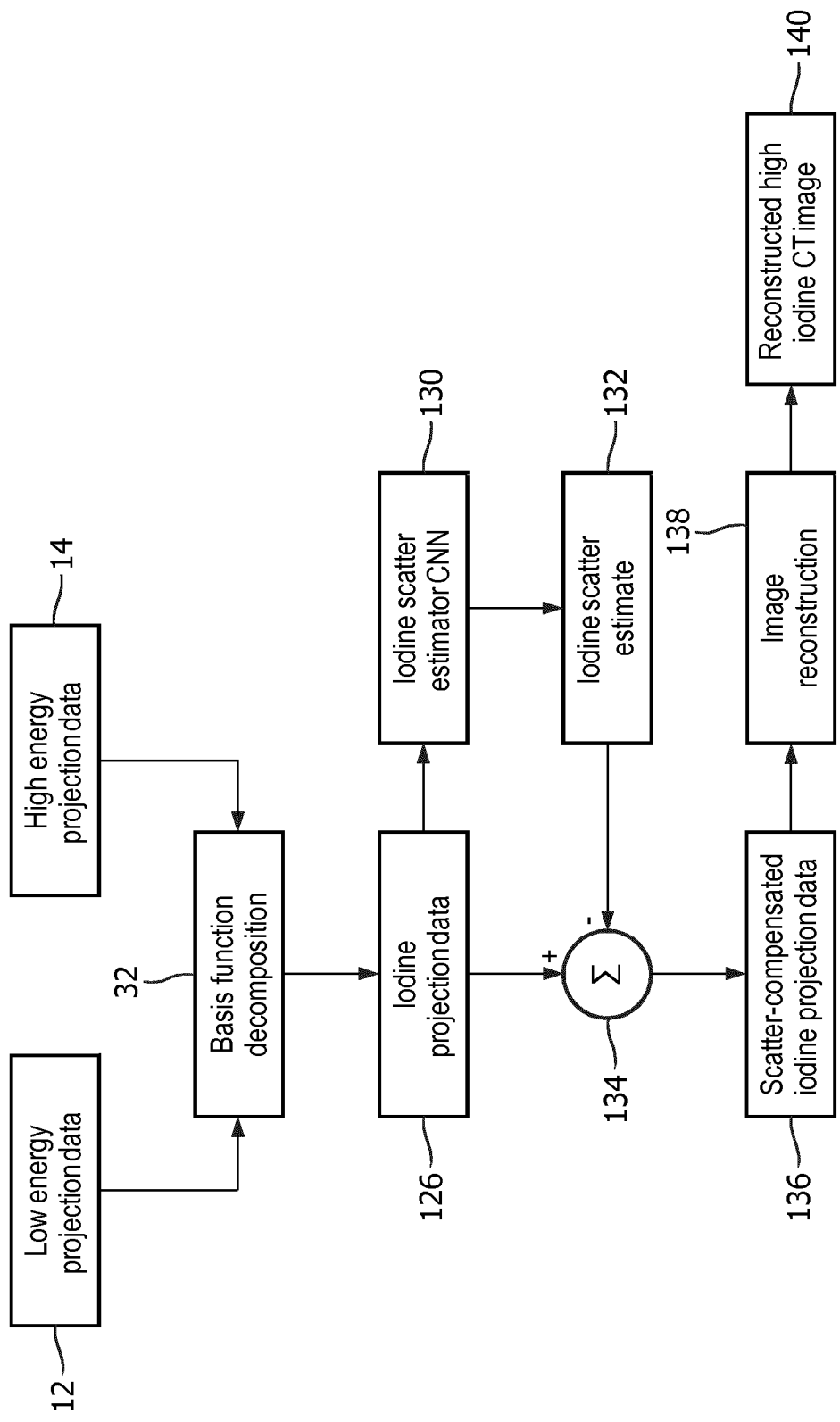

With reference to FIGS. 3-5, some illustrative examples of spectral CT image reconstruction using the scatter estimator neural network 40 are described. In each example, it is to be understood that the scatter estimator neural network 40 employed is trained for the particular type of spectral CT data being reconstructed. For example, as shown in FIG. 3 the low energy projection data 12 are input to a low energy scatter estimator convolutional neural network (CNN) 90 that has been trained as per the process of FIG. 2 using Monte Carlo simulated low energy projections data (e.g. with the simulated CT system 64 being the IQon™ spectral CT and simulating only output of the upper, or low energy, x-ray detector layer) to produce a low energy scatter estimate 92. At a difference operation 94, the low energy scatter estimate 92 is subtracted from the low energy projection data 12 to generate scatter-compensated low energy projection data 96. An image reconstruction 98, such filtered backprojection, iterative forward-backward reconstruction, or so forth, is applied to the scatter-compensated low energy projection data 96 to generate a scatter-corrected reconstructed low energy CT image 100.

With reference to FIG. 4, the high energy projection data 14 are input to a high energy scatter estimator CNN 110 that has been trained as per the process of FIG. 2 using Monte Carlo simulated high energy projections data (e.g. with the simulated CT system 64 being the IQon™ spectral CT and simulating only output of the lower, or high energy, x-ray detector layer) to produce a high energy scatter estimate 112. At a difference operation 114, the high energy scatter estimate 112 is subtracted from the high energy projection data 14 to generate scatter-compensated high energy projection data 116. An image reconstruction 118, such as filtered backprojection, iterative forward-backward reconstruction, or so forth, is applied to the scatter-compensated high energy projection data 116 to generate a scatter-corrected reconstructed high energy CT image 120.

Instead of producing low energy and high energy images 100, 120 as illustrated in FIGS. 3 and 4, in other embodiments the scatter-compensated low and high energy projection data sets 96, 116 may be used to generate decomposed projections for spectral image reconstructions, e.g. by inputting the low and high energy projection data sets 96, 116 into the basis function decomposition 32 (see FIG. 1) appropriate for the desired spectral image (e.g. water image, iodine image, or so forth).

With reference to FIG. 5, another approach for reconstruction of a scatter-corrected iodine image is shown, in which the basis function decomposition 32 is applied prior to the CNN-based scatter correction. The low energy projection data 12 and the high energy projection data 14 are input to the appropriate basis function decomposition 32 to generate iodine projection data 126, which is input to an iodine scatter estimator CNN 130 that has been trained as per the process of FIG. 2 using Monte Carlo simulated iodine projections data (e.g. with the simulated CT system 64 being the IQon™ spectral CT and simulating the outputs of both detector layers and applying the appropriate basis function decomposition 32 to generate simulated iodine projection data) to produce an iodine scatter estimate 132. At a difference operation 134, the iodine scatter estimate 132 is subtracted from the iodine projection data 126 to generate scatter-compensated iodine projection data 136. An image reconstruction 138, such as filtered backprojection, iterative forward-backward reconstruction, or so forth, is applied to the scatter-compensated iodine projection data 136 to generate a scatter-corrected reconstructed iodine CT image 140.

While the embodiment of FIG. 5 operates to produce an iodine image, analogous processing may be used to produce a scatter-corrected reconstructed CT image of another spectral decomposition, such as a water image. To do so, the appropriate basis function decomposition 32 is applied, and a scatter estimator CNN that has been trained as per the process of FIG. 2 using Monte Carlo simulated projection data of the desired (e.g. water) decomposition is employed to produce a scatter estimate for the desired decomposition.

In the examples of FIGS. 3-5, the appropriate trained scatter estimator neural network 40 (e.g. low energy scatter estimator CNN 90, high energy scatter estimator CNN 110, or iodine scatter estimator CNN 130) performs the entire scatter correction. In other embodiments, an appropriate trained scatter estimator neural network may be employed in combination with some other scatter correction.

Figure 6:
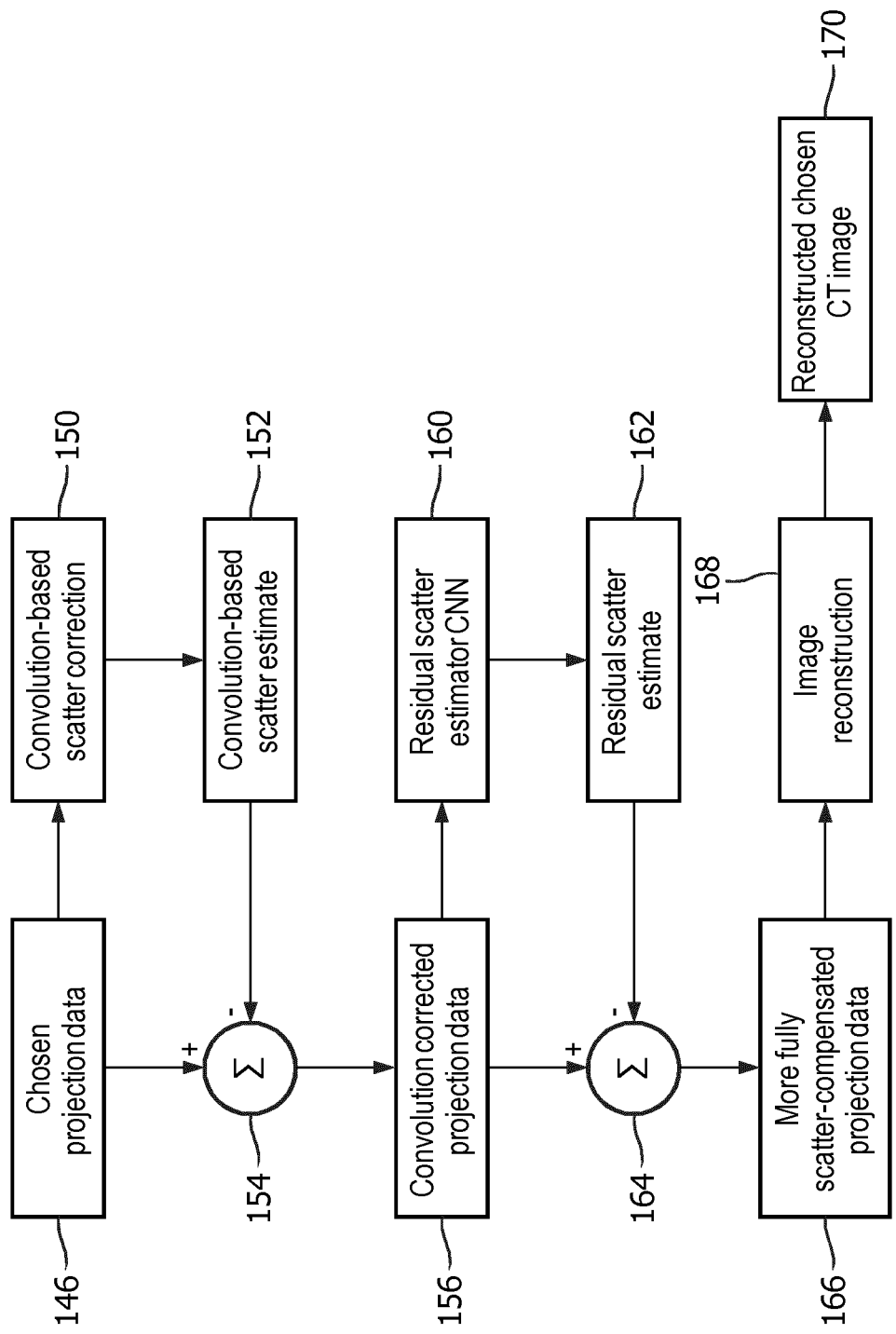
FIG. 6 diagrammatically shows an approach by which the spectral CT imaging system of FIG. 1 can perform CT image reconstruction including scatter correction performed in the projection domain using a combination of convolutional scatter correction followed by residual scatter correction using a scatter estimator neural network.

With reference to FIG. 6, as an example of this, chosen projection data 146 (e.g. one of the illustrative projection data sets 12, 14 or a decomposed projection data set such as the iodine projection data set 126) is initially processed by a convolution-based scatter correction 150 (or, in another embodiment, a deconvolution-based scatter correction, or more generally any type of scatter correction) to produce a scatter estimate 152. At a difference operation 154, the convolution-based scatter estimate 152 is subtracted from the chosen projection data 146 to generate convolution-corrected projection data 156. A residual scatter estimator CNN 160 is then applied to the convolution-corrected projection data 156 to generate a residual scatter estimate 162. At a second difference operation 164, the residual scatter estimate 162 is subtracted from the convolution-corrected projection data 156 to generate more fully scatter-compensated projection data 166. An image reconstruction 168, such as filtered backprojection, iterative forward-backward reconstruction, or so forth, is applied to the more fully scatter-compensated projection data 166 to generate a (more fully) scatter-corrected reconstructed CT image 170. In this example, the residual scatter estimator CNN 160 has been trained as per the process of FIG. 2 using Monte Carlo simulated convolution-corrected projection data (e.g. with the output of the simulated CT system 64 being processed by the convolution-based scatter correction 150 to generate simulated convolution-corrected projection data).

In the examples of FIGS. 3-6, the appropriate trained scatter estimator neural network 40 is applied in projection space, that is, to the projection data, to generate a scatter estimate in projection space. Alternatively, the appropriate trained scatter estimator neural network can be applied in image space, that is, to an uncorrected reconstructed CT image, to generate a scatter estimate in image space that is then subtracted from the uncorrected reconstructed CT image to produce the scatter corrected reconstructed CT image.

Figure 7:
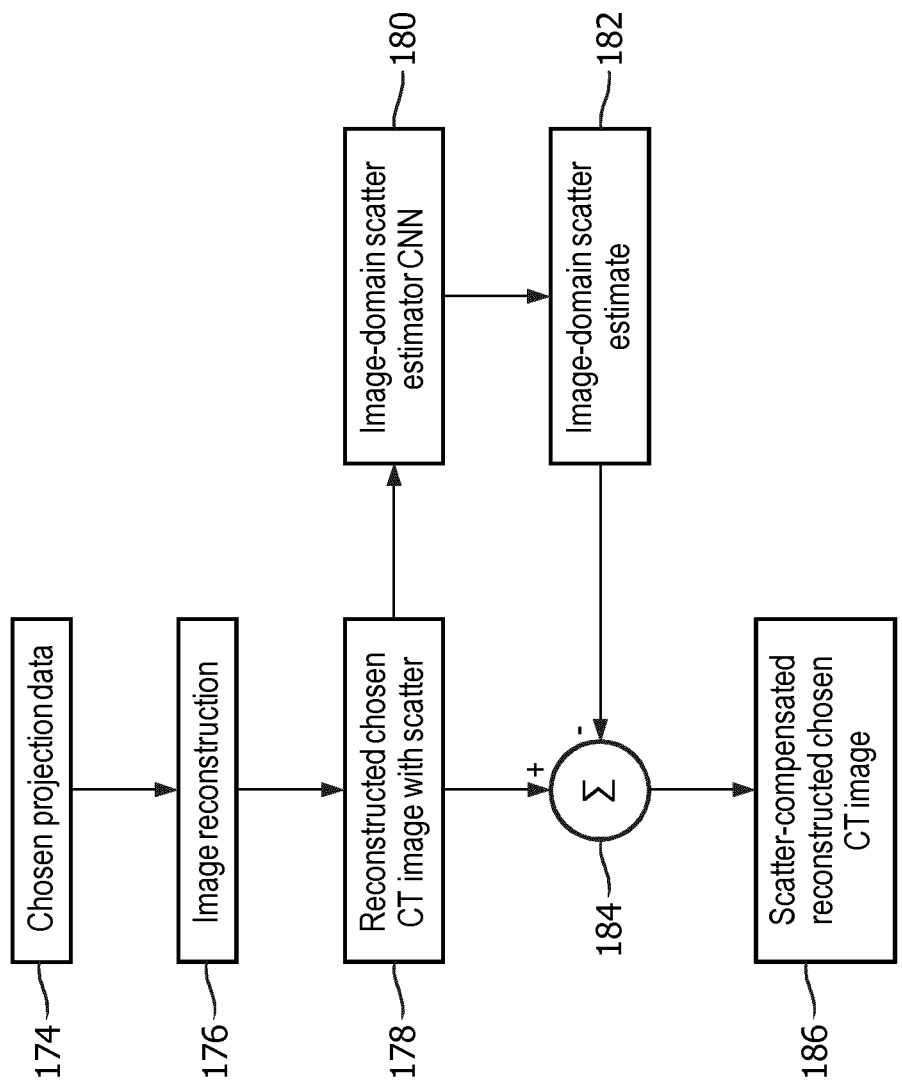
FIG. 7 diagrammatically shows an approach by which the spectral CT imaging system of FIG. 1 can perform CT image reconstruction including scatter correction performed in the image domain using a scatter estimator neural network.

With reference to FIG. 7, in an illustrative example of the foregoing, chosen projection data 174 (e.g. one of the illustrative projection data sets 12, 14 or a decomposed projection data set such as the iodine projection data set 126) is processed by an image reconstruction 176, such filtered backprojection, iterative forward-backward reconstruction, or so forth, to generate an uncorrected reconstructed CT image 178 (that is, uncorrected for scatter). An image domain scatter estimator CNN 180 is applied to the uncorrected reconstructed CT image 178 to generate an image-domain scatter estimate 182, that is, a scatter estimate in image space. At a difference operation 184, the image-domain scatter estimate 182 is subtracted from the uncorrected reconstructed CT image 178 to generate a scatter-compensated reconstructed CT image 186 corresponding to the chosen projection data 174. In this case, the image domain scatter estimator CNN 180 is trained as per FIG. 2, except that the simulated data serving as input for the training (that is, corresponding to the simulated projection data 74 of FIG. 2) is a simulation uncorrected reconstructed image that is reconstructed from the simulated projection data 74, with the reconstruction including reconstructing the simulated scatter projection data component 72 into a simulated scatter image component of the simulated uncorrected reconstructed CT image. The image domain scatter estimator neural network 180 is then trained to transform the simulated uncorrected reconstructed CT image to a simulated scatter estimate in the image domain for which a value of a difference metric comparing the simulated scatter estimate in the image domain to the simulated scatter image component is minimized by the training.

Said another way, the image domain scatter estimator CNN 180 is configured by neural network training to transform a simulated uncorrected reconstructed CT image to a simulated scatter estimate for which a value of a difference metric comparing the simulated scatter estimate to a simulated scatter image component of the simulated uncorrected reconstructed CT image is minimized by the training. In this approach, the simulated uncorrected reconstructed CT image is generated by reconstruction of Monte Carlo simulated CT imaging data including Monte Carlo simulation of at least one scattering mechanism producing simulated scatter projection data that is reconstructed into the simulated scatter image component of the simulated uncorrected reconstructed CT image.

With returning reference to FIG. 2, if there are two different scattering mechanisms to be corrected, e.g. scattering in the imaging subject and scattering in a filter installed in the x-ray tube assembly, this can be handled in two ways. In one approach, both scattering mechanisms are included in the simulated scattering mechanisms 66, and a single Monte Carlo simulation generates the simulated projection data 74 including a scatter projection component 72 that includes scatter events due to both simulated scattering mechanisms. The resulting (single) trained scatter estimator neural network will then estimate the combined scatter produced by both scatter mechanisms. In a variant approach, the Monte Carlo simulation is run twice—once for each scattering mechanism. This produces two scatter estimator neural networks. For the illustrative example, one of these scatter estimator neural networks estimates imaging subject scatter, while the other scatter estimator neural network estimates scatter in the filter. In this case, the two different scatter estimator neural networks representing two different scatter mechanisms can be applied in sequence, with each trained as per the training approach of FIG. 2 on different simulated imaging data generated by Monte Carlo simulation including simulation of a different scattering mechanism. While this latter approach requires more simulation time, it can have an advantage in creating a modular scattering correction system. For example, if the spectral CT device 10 has two or more different filters which are installable on the x-ray tube assembly, e.g. for different purposes, then a separate scatter estimation neural network can be trained for each such filter. If two filters are used in combination, the total scattering by the two filters can be determined by applying the corresponding trained scatter estimator neural networks one after the other. Likewise, different scatter estimator neural networks can be trained for different types of imaging subjects (e.g. adult, pediatric, normal weight, obese, et cetera) and the appropriate subject scattering estimator neural network may be employed, along with the appropriate filter scatter estimation neural network if a filter is employed. Such modularity provides a great deal of flexibility in tailoring the scatter correction to the specific CT imaging subject and CT imaging device configuration in use in a particular CT examination.

In the following, some further illustrative examples are described.

The illustrative scatter estimator neural network is a CNN based on a VGG network (Simonyan et al., "Very deep convolutional networks for large-scale image recognition," arXiv Prepr. arXiv1409.1556, 1409), and the depth of the neural network is set based on the required receptive field. For model learning, a residual learning formulation is employed, and incorporated with batch normalization for fast training and improved performance. In illustrative examples, the size of the convolution filter is set to 3×3 with all pooling layers removed. Therefore, the receptive field of the CNN with depth of d is (2d+1)×(2d+1). The dimension of each projection is down-sampled from 672×64 to 168×16. Here 168 is the number of rescaled x-ray detector rows along the X-direction and 16 is the number of rescaled slices along the Z-direction. For the target spectral CT system, anti-scatter grids are only placed along the X-direction. Therefore, it is reasonable to assume that the scatter signal in one (resampled) detector pixel is correlated with the signal along all 16 detector rows in Z, where no anti-scatter grids are present, and only a limited number of neighboring detector slices along X. Based on experiments, a value of 32 was chosen. In the illustrative examples, d=17 was set, and each projection with dimension 168×16 was divided into many small patches with dimension 32×16. The first of 17 convolution layers in the CNN consisted of 64 filters of size 3×3, layers 2-16 each consisted of 64 filters of size 3×3×64, and the last layer consisted of a single filter of size 3×3×64. Except for the last layer, each convolution layer was followed by a batch normalization, which was included to speed up training as well as boost performance (see Zhang et al., "Beyond a Gaussian Denoiser: Residual Learning of Deep CNN for Image Denoising," pp. 1-13, 2016), and rectified linear units (ReLU), which were used to introduce nonlinearity. Zero padding was performed in each convolution layer to maintain the correct data dimensions.

The input to the CNN, denoted r, was the air-normalized primary signal (p) with additional scatter (s), that is, r=p+s. The residual learning formulation was used to train a residual mapping T(r)~s, from which the desired signal p=r−T(r) was determined. The CNN parameters were estimated by minimizing the following distance function:

$$d(w) = \sum_j \left( \|T(r; w)_j - s_j\|_2^2 + \lambda_1 \|\nabla T(r; w)_j\|_1 \right) + \lambda_2 \sum_k \|w_k\|_2^2$$

where w is the set of all weights of all layers and k=1, . . . , 17 denotes the layer index. The regularization terms encourage a smoothed scatter signal and small network kernels. In the tests, the regularization parameters $\lambda_1 = \lambda_2 = 10^{-3}$ were used. Here $$\{(r_j, s_j)\}_{j=1}^N$$

represents N training pairs of scattered raw signal and scatter-only signal, where j is the index of training unit. The training sets were obtained from Monte Carlo simulations.

The minimization of the distance (i.e. loss) function was performed by using conventional error backpropagation with stochastic gradient descent (SGD). In the SGD, an initial learning rate was set to 0.01, and the learning rate was continuously decreased down to $10^{-5}$. Mini-batches of size ten were used, indicating that ten randomly chosen sets of data were used as a batch for training. The method was implemented in MATLAB™ using the MatConvNet toolbox. A model-based Monte Carlo simulation was employed to generate the training sets. The geometry setup and parameters of the simulations were chosen to mimic the characteristics of the Philips iQon™ system, which has a dual-layer detector. The top layer is the low energy detector and the bottom layer the high energy detector.

Training sets were created by Monte Carlo simulation as follows. The simulations were performed with a (simulation) tube voltage of 120 kVp. Three phantoms were simulated: a 30 cm diameter cylindrical water phantom, a liver phantom, and an obese phantom. For each simulated phantom, the primary signal was determined analytically using 600 (obese and liver) or 2400 (water) projections over a full rotation of 360 degrees. Scatter data was collected by simulating 60 projections over a full rotation with $5 \times 10^8$ (water and liver) or $4.5 \times 10^9$ (obese) photons per projection. Due to the expensive computation, a limited number of six representative scans were used to generate training sets: one for the water and obese phantom each and four for the liver phantom at different shifts of the phantom in cranio-caudal direction. Data was divided in patches of size 32×16 augmented by simply flipping along X-direction. The network was trained separately for the low energy layer and the high energy one. The total training time for each layer was about six hours on a Dell T7600 workstation with a Titan X GPU.

Testing sets were created as follows. For testing the same (simulated) liver phantom as above was used but at a cranio-caudal shift that was not used for training. A 30 cm water cylinder was used as well but this time actually scanned on a Philips iQon™ system, not simulated. Scatter was estimated by applying the trained network to the low and high-energy signals separately. Scatter correction was performed by subtracting the corresponding scatter estimate from the raw data of each layer. The corrected high and low projection data were then further decomposed into energy independent basis functions, such as iodine and water. These were reconstructed into basis functions in image space. Monochromatic images were constructed as linear combinations of basis functions.

Figure 8:
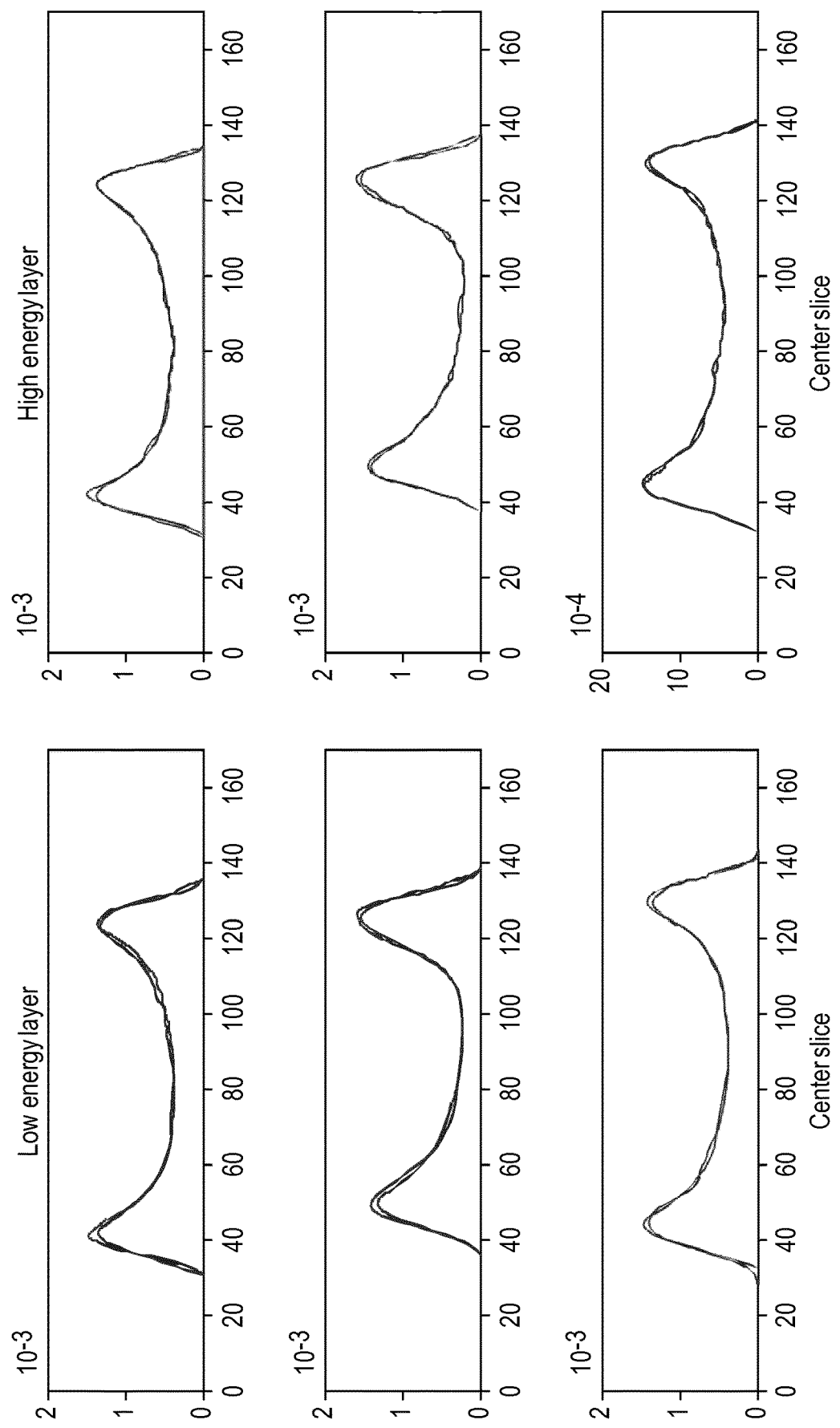
FIGS. 8-11 present test results as described herein.

With reference to FIG. 8, for the simulated data, scatter profiles from the CNN at the center slice of three different views are plotted, and compared to the those from the Monte Carlo simulation (which serves as ground truth) for both detector layers. As can be seen in FIG. 8, the match between the CNN scatter estimate and the ground truth from the Monte Carlo simulation is very close.

Figure 9:
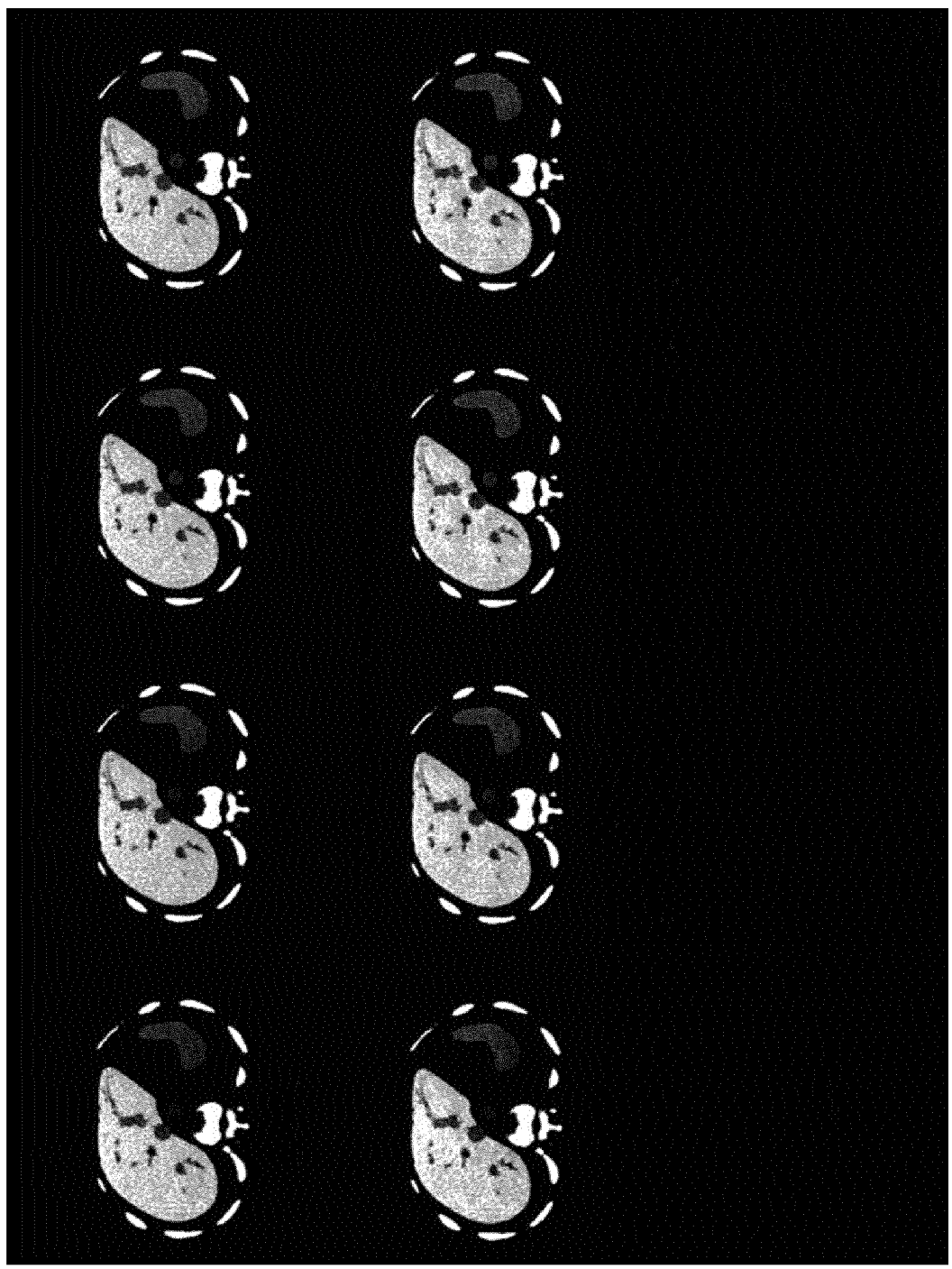

With reference to FIG. 9, after applying the CNN-based scatter correction, monochromatic images ([−50,50]) at 60 keV, 80 keV, 100 keV and 120 keV are reconstructed and compared to the monochromatic images obtained from reconstructing the primary signal. The top row of images in FIG. 9 show the primary monochromatic images (which serves as ground truth as these images are reconstructed from the Monte Carlo simulated primary CT signal without the scatter component), the middle row of images in FIG. 9 show the CNN-corrected monochromatic images (that is, both primary and scatter data combined is reconstructed, and the CNN is used to generate the scatter estimate which is subtracted off), and the bottom row of images show the difference images.

Figure 10:
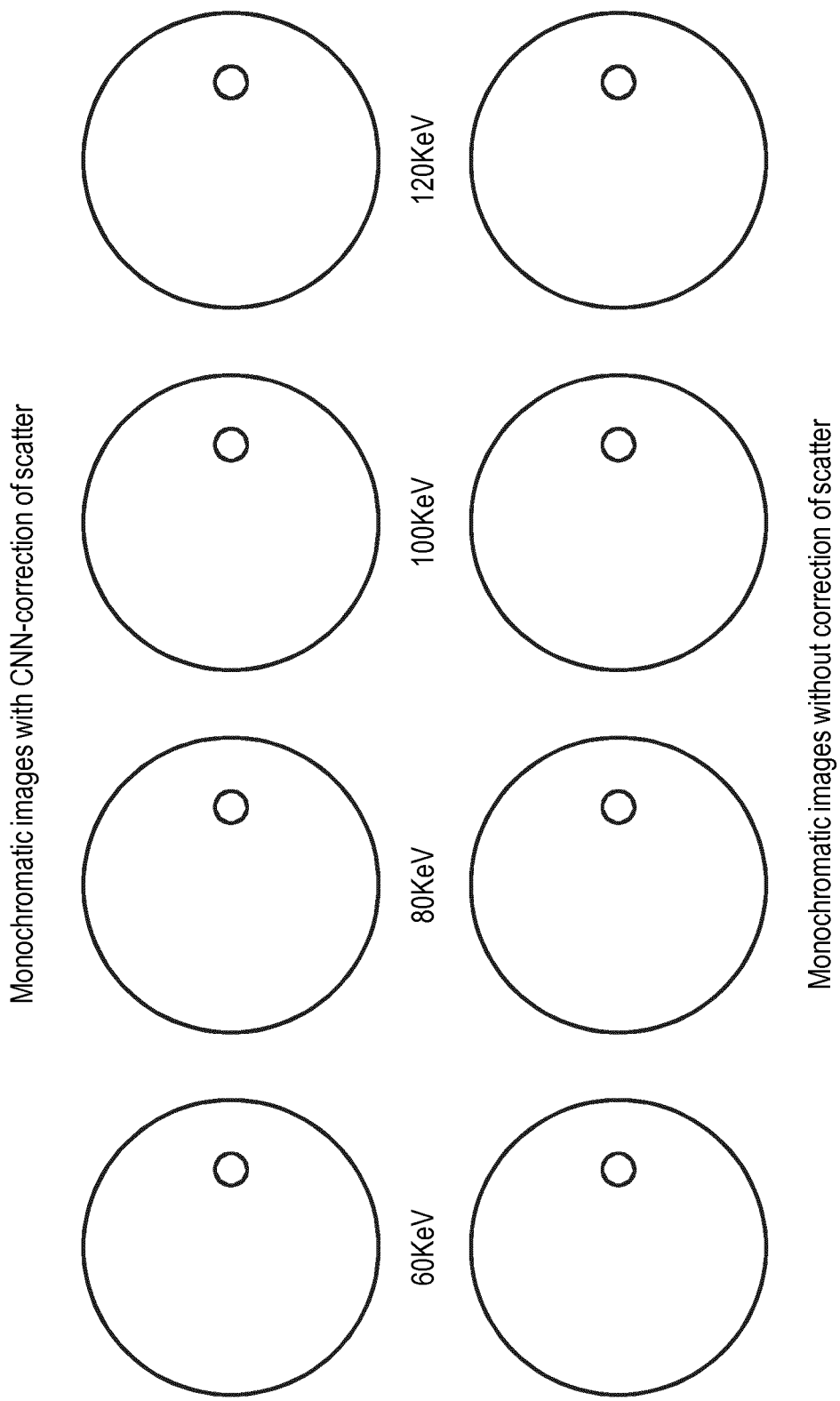
Figure 11:
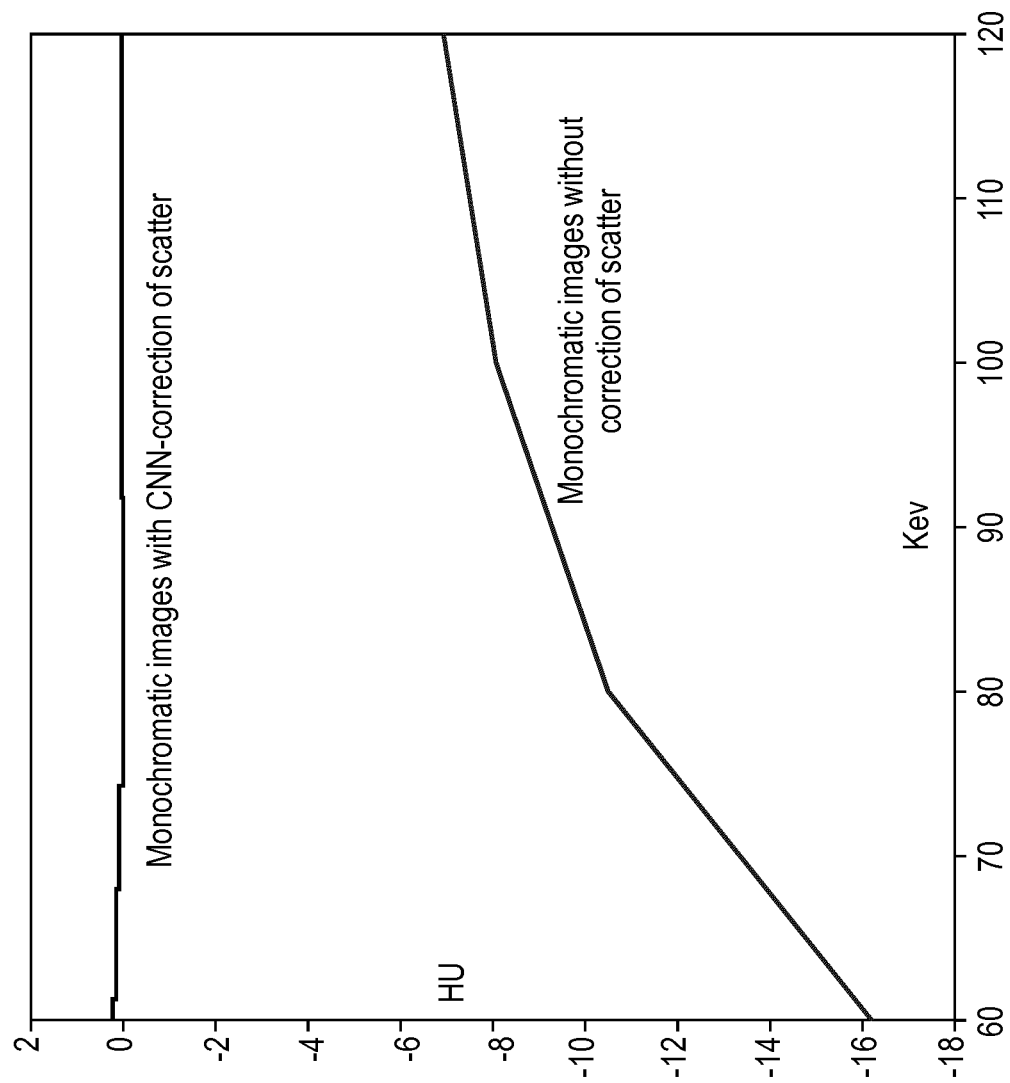

With reference to FIGS. 10 and 11, for scatter corrected image reconstruction of the actually acquired water phantom CT projection data, monochromatic images from 60 keV is shown in FIG. 10, and dispersion curves are shown in FIG. 11, both compared with results without scatter correction. In FIG. 10, the top row of images show CNN-corrected monochromatic images ([−50 50]) at 60 keV, 80 keV, 100 keV and 120 keV; while the bottom row of images show the corresponding monochromatic images without scatter correction ([−50 50])) on the bottom. The dispersion curves shown in FIG. 11 are drawn by determining the average Hounsfield unit (HU) value in the water phantom for each keV, which is expected to be flat at zero for water across keV. The computing time to estimate scatter for each projection is about 6-7 ms on the graphical processing unit (GPU) enabled workstation.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory storage medium configured to store instructions readable and executable by a processor to perform a method comprising:
   inputting an uncorrected computed tomography (CT) image into a neural network to output an image domain scatter estimate, wherein the neural network is trained to transform a simulated uncorrected CT image to a simulated scatter estimate for which a value of a difference metric, comparing the simulated scatter estimate to a simulated scatter image component of the simulated uncorrected CT image, is minimized by the training;
   reconstructing CT projection data to generate the uncorrected CT image; and
   correcting the uncorrected CT image by subtracting the image domain scatter estimate from the uncorrected CT image to generate the scatter-corrected CT image.

2. The non-transitory storage medium of claim 1, wherein the simulated uncorrected CT image is generated by reconstruction of Monte Carlo simulated CT imaging data including Monte Carlo simulation of at least one scattering mechanism producing simulated scatter projection data that is reconstructed into the simulated scatter image component of the simulated uncorrected CT image.

3. The non-transitory storage medium of claim 1, wherein the CT projection data is processed by a basis function decomposition of acquired spectral or dual energy CT imaging data.

4. The non-transitory storage medium of claim 3, wherein the basis function decomposition of the acquired spectral or dual energy CT imaging data produces the CT projection data as water projection data or iodine projection data.

5. The non-transitory storage medium of claim 1, wherein the scatter-corrected CT image is displayed on a display device.

6. The non-transitory storage medium of claim 1, wherein the CT projection data is generated by performing a convolution- or deconvolution-based scatter correction on acquired CT projection data received from a CT imaging device.

7. A computer-implemented method, comprising:
   inputting an uncorrected computed tomography (CT) image into a neural network to output an image domain scatter estimate, wherein the neural network is trained to transform a simulated uncorrected CT image to a simulated scatter estimate for which a value of a difference metric, comparing the simulated scatter estimate to a simulated scatter image component of the simulated uncorrected CT image, is minimized by the training;
   reconstructing CT projection data to generate the uncorrected CT image; and
   correcting the uncorrected CT image by subtracting the image domain scatter estimate from the uncorrected CT image to generate the scatter-corrected CT image.

8. The method of claim 7, further comprising:
   acquiring the CT projection data using a CT imaging device.

9. An imaging system, comprising:
   a computed tomography (CT) imaging device;
   a processor configured to:
      input an uncorrected computed tomography (CT) image into a neural network to output an image domain scatter estimate, wherein the neural network is trained to transform a simulated uncorrected CT image to a simulated scatter estimate for which a value of a difference metric, comparing the simulated scatter estimate to a simulated scatter image component of the simulated uncorrected CT image, is minimized by the training;
      reconstruct CT projection data to generate the uncorrected CT image; and
      correct the uncorrected CT image by subtracting the image domain scatter estimate from the uncorrected CT image to generate the scatter-corrected CT image.

10. The imaging system of claim 9, wherein:
    the neural network includes two or more neural networks each trained on different simulated imaging data generated by Monte Carlo simulation including simulation of imaging of human subjects of different anatomical dimensions or body weights.

11. The imaging system of claim 9, wherein:
    the neural network includes two or more neural networks each trained on different simulated imaging data generated by Monte Carlo simulation including simulation of scattering by different filters installable on the CT imaging device.

* * * * *